US005580201A

United States Patent [19]
Brilmyer

[11] Patent Number: 5,580,201
[45] Date of Patent: Dec. 3, 1996

[54] CAM BOLT SYSTEM

[75] Inventor: Harold G. Brilmyer, Grosse Pointe, Mich.

[73] Assignee: General Motors Corporation, Detroit, Mich.

[21] Appl. No.: 551,380

[22] Filed: Nov. 1, 1995

[51] Int. Cl.$^6$ .................................................... F16B 19/00
[52] U.S. Cl. ............................ 411/354; 411/169; 411/87; 411/397
[58] Field of Search .................................... 411/397, 354, 411/169, 87

[56] References Cited

U.S. PATENT DOCUMENTS

| | | | |
|---|---|---|---|
| 696,582 | 11/1901 | Meyers | 411/397 |
| 2,525,217 | 10/1950 | Glitsch | 411/169 |
| 4,790,703 | 12/1988 | Wing | 411/260 |
| 5,027,275 | 6/1991 | Sakamoto et al. | 364/424.05 |
| 5,482,417 | 1/1996 | Erickson | 411/354 |

FOREIGN PATENT DOCUMENTS 48875  3/1986  Japan .

OTHER PUBLICATIONS

Produck Engineering, Oct. 1952 p. 149.

*Primary Examiner*—Steven N. Meyers
*Assistant Examiner*—Fredrick Conley
*Attorney, Agent, or Firm*—Anthony Luke Simon

[57] ABSTRACT

A cam bolt system comprising a bolt with a threaded shaft and a head on one end thereof, wherein a cross section of the shaft is trilobal in shape and wherein the trilobal shaped shaft is threaded from one end opposite the head substantially the length of the shaft to the end with the head thereon, first and second cams, each identical to the other and each having a generally circular perimeter and a triangularly shaped opening of substantially similar shape to the trilobal shape of the shaft and sized large enough so as to freely slide on the shaft, wherein the shaft extends through the openings of the first and second cams and wherein neither the first nor the second cam can substantially rotate with respect to the shaft and wherein the two cams are identically aligned with respect to the shaft, and a nut threadably engaging the shaft maintaining the first and second cams in position on the shaft.

2 Claims, 3 Drawing Sheets

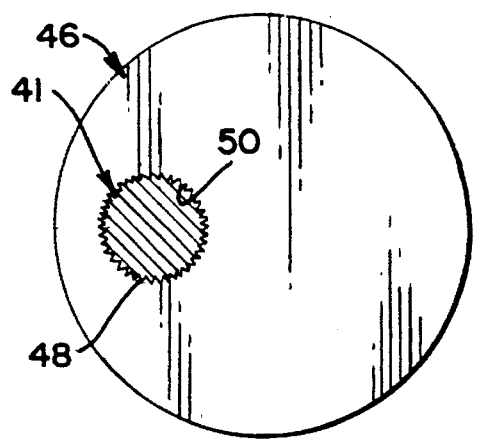
FIG - 5
PRIOR ART
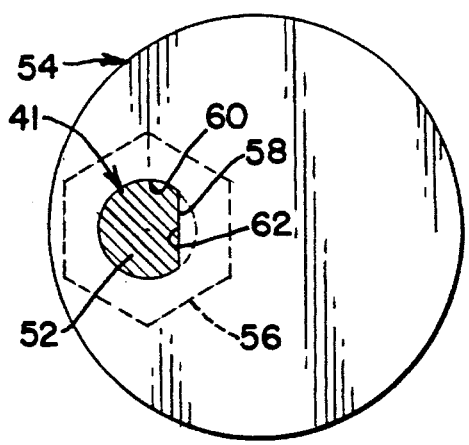
FIG - 6
PRIOR ART
FIG - 7
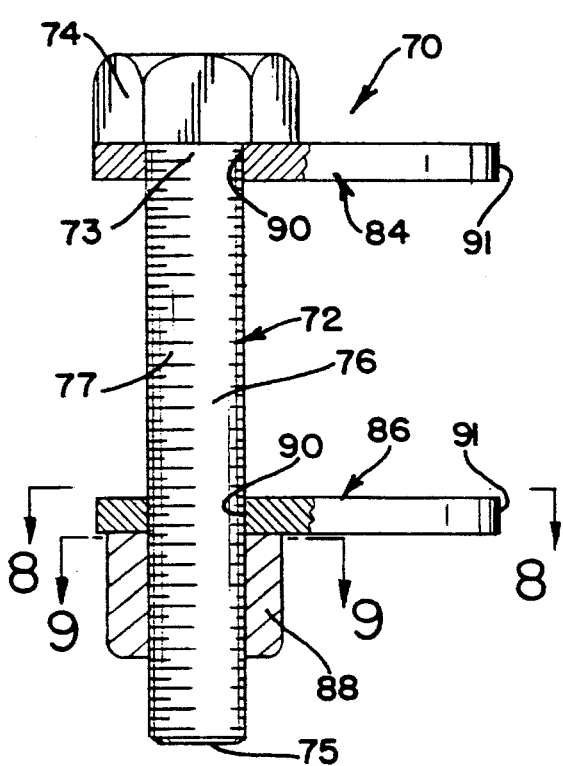
FIG - 8
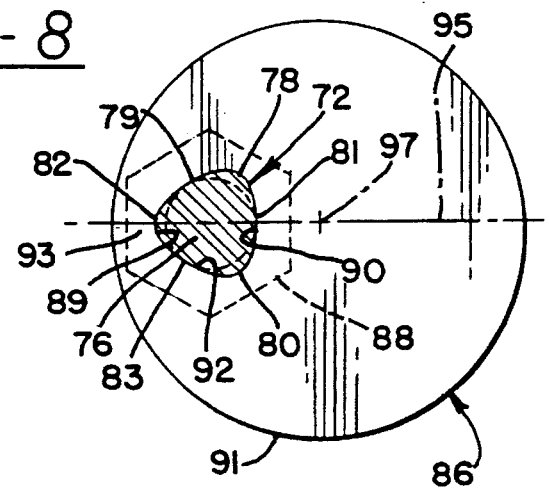
FIG - 9
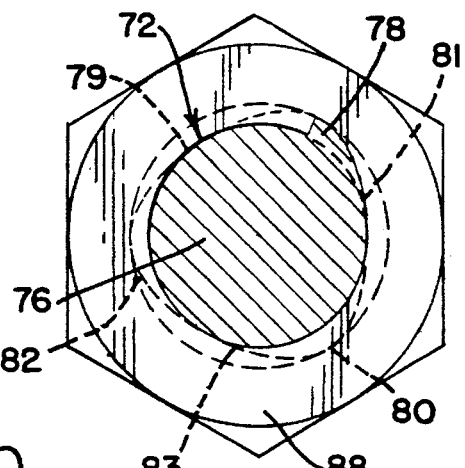

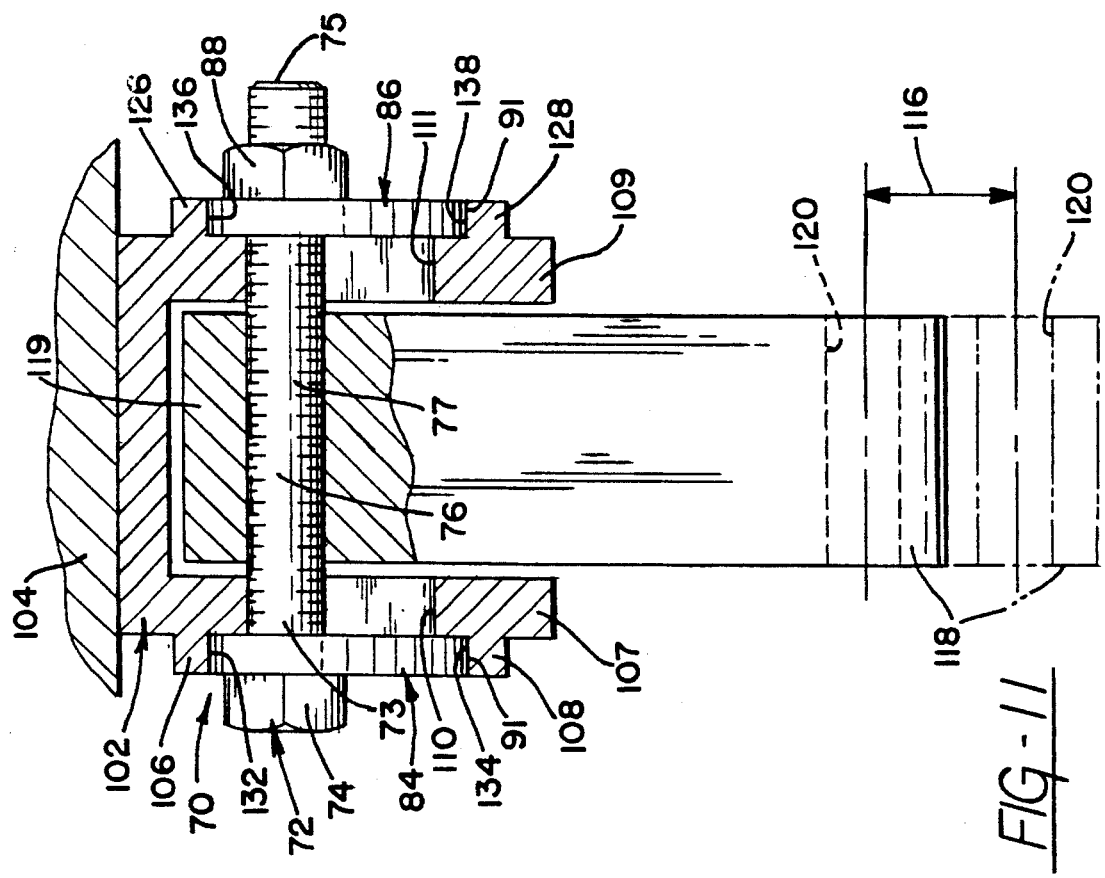
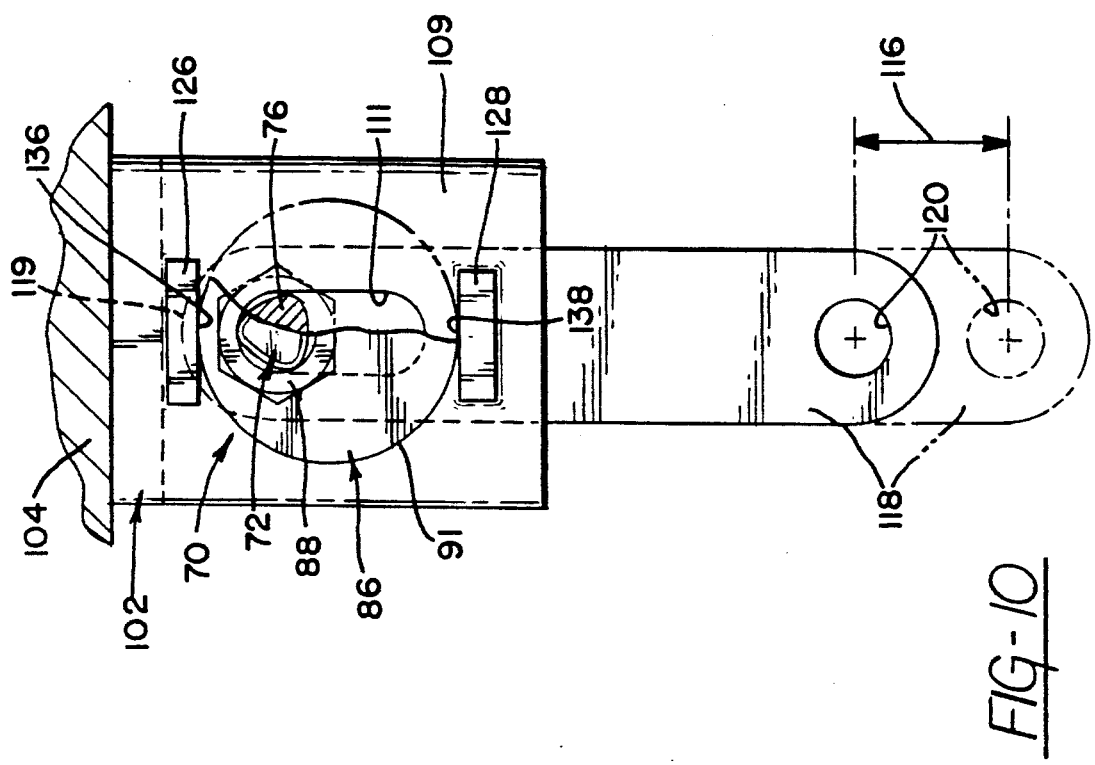
FIG-11
FIG-10

CAM BOLT SYSTEM

This invention relates to a cam bolt system apparatus and method.

BACKGROUND OF THE INVENTION

Cam bolt systems provide a known manner of positionally adjusting linkages. In one known example, a cam bolt system is used in an automotive vehicle suspension linkage and provides the means to control alignment of the wheel tire assembly, i.e., camber, caster and/or toe alignment.

FIGS. 1–3 illustrate an example known cam bolt system 10 including a bolt 11 with a hexagonal head 14, a first shaft portion 12, with a circular cross section, extending a predetermined distance from the head 14, a second shaft portion 18 having a rounded rectangular cross section extending from the end of the first shaft portion 12 and a third shaft portion 20 having a circular cross section and threaded to receive nut 26.

A first cam 16 is fixedly attached to the first shaft portion 12 proximate to the head 14 and thus turns when the head 14 of the bolt 11 is turned. A second cam 22 has a rounded rectangular opening 24 of a shape to match and freely slide over second shaft portion 18. In an optimal system, cam 22 has little free play and is forced to turn with the bolt 11. The cams 16 and 22 operate together on two sets of cam followers (not shown) in a known manner (discussed in more detail below with reference to FIGS. 10 and 11) when the head 14 of the bolt 11 is turned. The result of the operation of the cams 16 and 22 on the cam followers (not shown) is that the position of the bolt 11 moves in the direction of arrows 13, positionally aligning the linkage or other system that is coupled to shaft portion 12 of the bolt 11.

When the bolt 11 is in the correct position, the nut 26 is tightened down, locking the bolt 11 and cams 16 and 22 in place. In the example shown, the nut 26 has a threaded portion 30 in the body 28 of the nut 26 and, on the end engaging the cam 22, a machined out opening 32, which tapers (reference 34) down to the threaded portion 30. The machined out portion 32 provides clearance for the end 31 of the nut 26 over the rounded rectangular shaped second shaft portion 18 of the bolt 11.

The cam bolt system shown in FIGS. 1–3 has numerous disadvantages including that it has two different cams 16, 22 and a bolt with three different cross section portions 12, 18 and 20, requiring machining of the bolt and leaving limited room for engagement of nut 26 on the bolt shaft portion 20. Further, care must be taken when attaching cam 16 to the shaft portion 12 so that cam 16 will be properly aligned with cam 22. This is necessary since cam 16 is not self aligning with respect to the bolt 11.

FIGS. 4–6 illustrate another prior art cam bolt system 40 including a bolt 41 having a hexagonal head 42 and a shaft comprising the spline 48, a portion 44 with a circular cross section and threaded and keyed portion 52. The threaded and keyed portion 52 is circular in cross section except for the key 58. The spline 48 retains the cam 46 on the shaft by an interference fit between the protrusions of the spline 48 and the perimeter 50 of the hole in the cam 46. The threaded portion of the shaft 52 is machined or broached to form a key or flat 58 for receiving cam 54 having an opening 60, which is round for most of its perimeter and has a flat 62 matching the key 58.

The cam bolt system 40 shown in FIGS. 4–6 operates in much the same way as the cam bolt system shown in FIGS. 1–3 with the two cams 46 and 54 turning when the bolt 41 is turned by the head 42. When the bolt 41 and cams 46 and 54 are properly positioned, the nut 56 is tightened retaining the cam bolt in place. A disadvantage of the system shown in FIGS. 4–6 is that, like the system shown in FIGS. 1–3, the bolt requires machining, in this case to create the key 58. Further the bolt shaft has three different sections, the spline 48, portion 44 with the circular cross section and the threaded and keyed portion 52. Additionally, like the system in FIGS. 1–3, the cam 46 is not self-aligning with respect to the bolt 41 and care must be taken when attaching cam 46 to the spline 48 so that cam 46 will be properly aligned with cam 54.

Also similar shown to the system shown in FIGS. 1–3, the system in FIGS. 4–6 requires two different cams, the upper cam 46 with a round hole to be press fit on the spline 48 and the lower cam 54 which must be able to slide over the threads and is fixed rotationally with respect to the bolt 41 by the key 58 and flat surface 62. It is noted that there is an inherent limited free play between the cam 54 and the bolt 41.

One disadvantage of both systems having two different cams is that one cam 22 (FIG. 1), 54 (FIG. 4) has play while the other cam 16 (FIG. 1), 46 (FIG. 4) does not have play with respect to the bolt, possibly resulting in slight misalignment of the two cams.

SUMMARY OF THE PRESENT INVENTION

A cam bolt system in accordance with the present invention is characterized by the features specified in claim 1.

Advantageously this invention provides a new cam bolt system that eliminates machining operations on the bolt shaft and reduces the number of unique parts necessary to achieve the cam bolt system. Advantageously, this invention provides a cam bolt system with two cams wherein both cams are identical, thus eliminating the necessity of the cam next to the bolt head being a first type and the cam at the distal end of the bolt being a second type.

Advantageously, this invention achieves the advantages recited herein through a cam bolt system comprising a bolt with a shaft having a head on one end wherein the shaft is trilobal in shape and is threaded from an end opposite the head substantially the length of the shaft to the head; first and second cams, each identical to the other and each having a generally circular shape and a triangularly shaped opening, off-center in the cam, of substantially similar shape to the trilobal shape of the shaft and sized large enough so as to freely slide on the shaft wherein neither of the first nor second cams, when placed on the shaft, can substantially rotate with respect to the shaft, wherein the two cams are identically aligned with respect to the shaft; and a nut for threadably engaging the shaft retaining the two cams on the shaft.

Advantageously, this invention provides a cam bolt system that reduces the number of unique parts necessary from four to three, offering design and cost savings.

BRIEF DESCRIPTION OF THE DRAWINGS

The present invention will now be described, by way of example, with reference to the accompanying drawings in which:

FIG. 5 illustrates a cross section along the plane defined by arrows 5—5 of the prior art cam bolt system in FIG. 4;

FIG. 6 illustrates a cross section along the plane defined by the arrows 6—6 of the prior art cam bolt system in FIG. 4;

FIG. 7 illustrates an example cam bolt system according to this invention;

FIG. 8 illustrates a cross section along the plane defined by the arrows 8—8 of the example cam bolt system shown in FIG. 7;

FIG. 9 illustrates a cross section along the plane defined by the arrows 9—9 of the example cam bolt system shown in FIG. 7; and FIGS. 10 and 11 illustrate an example linkage position adjustment system for use with the cam bolt system according to this invention.

DETAILED DESCRIPTION OF THE INVENTION

Figure 1:
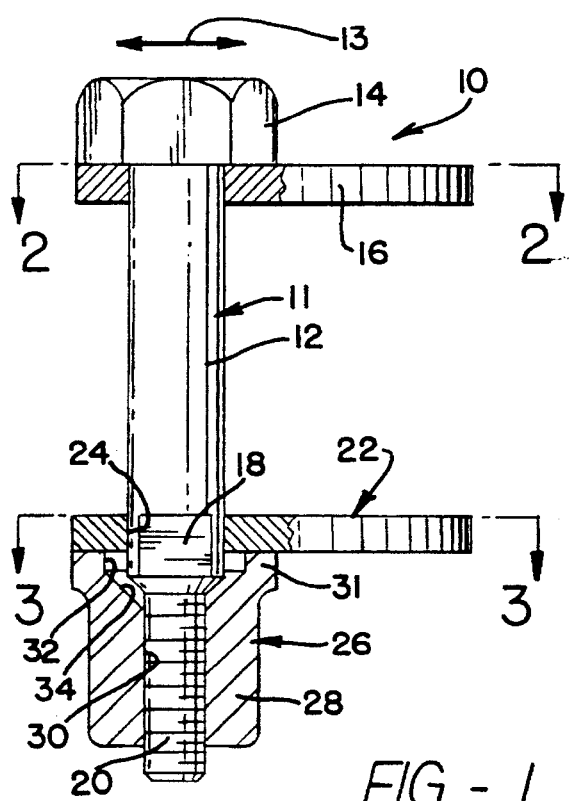
FIG. 1 illustrates a first prior art cam bolt system.
Figure 2:
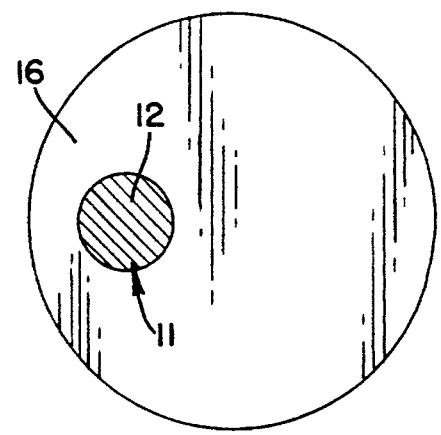
FIG. 2 illustrates a cross section along the plane defined by arrows 2—2 of the prior art cam bolt system in FIG. 1.
Figure 3:
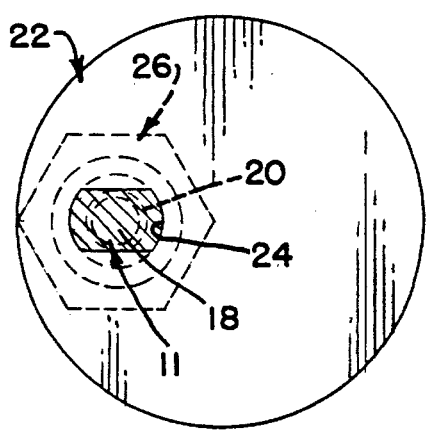
FIG. 3 illustrates a cross section along the plane defined by arrows 3—3 of the prior art cam bolt system in FIG. 1.
Figure 4:
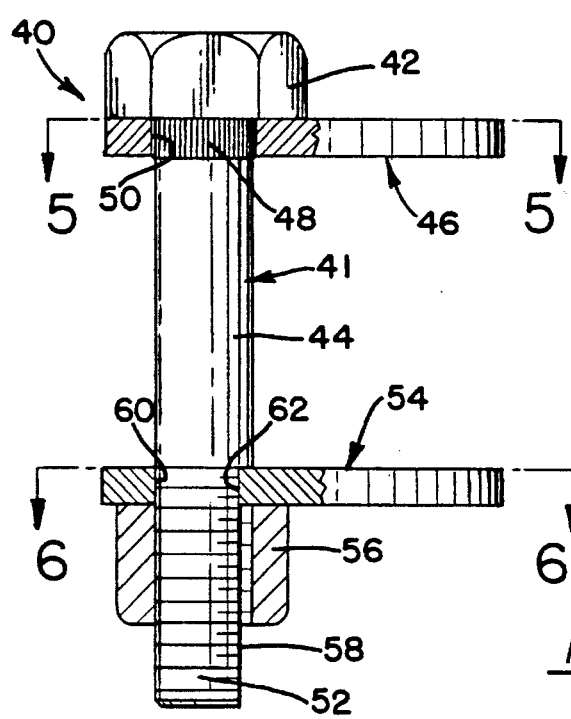
FIG. 4 illustrates a second prior art cam bolt system.

Referring now to FIGS. 7–9, the cam bolt system 70 of this invention is shown comprising a bolt 72 with a shaft 76 and a hexagonal shaped head 74 rigidly affixed thereon so that when the head 74 is turned by means of a tool or other positioning device, the shaft 76 rotates with the head 74. FIG. 8 illustrates a cross section of the shaft 76 showing the trilobal nature of a shaft wherein a shaft 76 has three equally spaced equal radius lobes 78, 80 and 82, with each of the sides 79, 81 and 83 of the shaft cross section shown being substantially equal in length.

As shown in FIG. 7, in the preferred example the threads 77 on the shaft 76 extend from the end 75 which is opposite the head 74 substantially to the end 73 proximate the head 74. The manufacture of trilobal threads is readily known to those skilled in the art and may be achieved by a flat die rolling operation well known to those skilled in the art of bolt manufacturing. The cam bolt system 70 includes first and second cams 84 and 86, each of which is identical to the other and, as shown in FIG. 8, each of which has a generally circular perimeter and a triangularly shaped hole 90 that is substantially similar in shape to the trilobal shape of the threaded shaft and sized just large enough so as to freely slide on the shaft but small enough to substantially prevent rotation of the cams 84, 86 with respect to the shaft 76 of the bolt 72. As used herein, the phrase to "substantially prevent rotation" means that, while there is some play between the cams 84, 86 and the shaft 76, the play is minimal and once the play is taken up, the cams 84, 86 rotate with the shaft 76. Because cams 84, 86 are identical, the amount of play between each cam 84, 86 and the shaft 76 will be substantially the same, so that each cam always remains aligned to the other.

Each hole 90 is off-center in the cam so that the cam is eccentric with respect to the center of the hole 90. The threaded shaft 76 extends through both cams 84, 86 wherein one cam 84 is located proximate to one end 73 and the head 74 and wherein the second cam 86 is located proximate to the second end 75 and nut 88. While not shown in FIG. 7, the portion of the threaded shaft 76 between the two cams 84 and 86 engages a bracket and a linkage to be positionally adjusted in the manner that will be described further below.

As can be seen from FIG. 7, the two cams 84 and 86 are identically aligned with respect to the threaded shaft 76 so that both rotate to the same position when the bolt 72 is rotated. The nut 88 threadably engages the end 75 of the shaft 76 and is used to maintain the cams 84 and 86 on the shaft and to maintain the bolt 72 affixed to the bracket (described below). As discussed further below, the nut 88 is tightened down when an adjustment using the cam system according to this invention is completed.

FIG. 8 illustrates the preferable orientation of the triangular opening 90 in the cams 84, 86 according to this invention. The opening 90 is symmetrical with respect to a line 95 drawn through the center 97 of the cam 84, 86 and the center of the lobe (or apex) 89 of the opening 90 closest to the perimeter 91 of the cam 84, 86. Thus, the triangular opening 90 is symmetrical about line 95 with an apex 89 pointing away from the center of the cam toward the perimeter. This minimizes the size of region 93 of cam 84, 86, which has the smallest distance between the inside perimeter 92 of the opening 90 and the outside perimeter 91 of the cam 84, 86.

Referring now to FIGS. 10 and 11, the linkage system of a known type for use with the cam system according to this invention is shown. The cam system 70 is mounted in the bracket 102, which is fixedly mounted, i.e., with respect to the car body or engine cradle as represented by reference 104 in a manner known to those skilled in the art. In general, the bracket provides a double shear joint and has either a rectangular tube or an open configuration including a clevis. According to this example as shown by FIG. 11, bracket 102 is a clevis having a generally U-shape and the shaft 76 of bolt 72 extends first through one cam 84 and then through elongated slot 110 in one side 107 of the bracket 102. The slot 110 is elongated in the direction in which adjustment is desired. The shaft 76 next extends through the linkage 118, which is to be adjusted using the cam system according to this invention, through a second elongated slot 111 in the second side of the 109 of the bracket 102, through the second cam 86 and is threadably engaged to nut 88 as shown.

The cams 84, 86 are identically aligned with respect to the bolt 72 in a manner easily achieved during assembly since each cam 84, 86 has only three possible positions with respect to the bolt 72. Thus the cams 84, 86 are partially self aligning.

During adjustment, the cams 84 and 86 engage the cam followers 106 and 108 on side 107 of the bracket 102 and cam followers 126 and 128 on side 109 of the bracket 102. The cam followers 106, 108, 126 and 128 are positioned on each end of the elongated slots as shown and have following surfaces 132, 134, 136 and 138, respectively, facing the elongated slots for engaging the cams 84, 86. The nut 88 is threadably engaged to the bolt 72 but is not tightened down until adjustment is completed, thus allowing movement of the bolt 72 within the slots 110, 111. When the head 74 of the bolt 72 is turned, the cams rotate in response and act on the followers 106, 108, 126, 128 to move the bolt in the adjusting directions as shown by arrow 116 to either further extend or further retract the linkage 118.

When the linkage is in the proper position, the nut 88 is tightened down locking the cam system 70 in the adjusted position on the bracket 102, preventing further movement of the linkage 118 in the direction 116. This affects adjustment of whatever is engaged through hole 120 in the end of the linkage 118. In one example, the known adjustment system shown in FIGS. 10 and 11, modified by including the cam bolt system 70 according to this invention, provides the means to control alignment of the wheel/tire assembly, i.e., camber, caster and toe adjustment. Any other linkage adjustment suitable for use with the cam bolt can be used with this invention as its use is not limited to that of an automotive suspension system.

In view of the above description of the apparatus of this invention, it is apparent to one skilled in the art that this invention is embodied in a method for use in an adjustment system with first and second cam followers 106 and 108 aligned on either side of a first elongated slot 110 in a first planar side 107 of bracket 102 and third and fourth cam followers 126 and 128 aligned on either side of a second elongated slot 111 in a second planar side 109 of bracket 102 parallel to the first planar side 107 and spaced perpendicularly apart therefrom, and a linkage member (link 118) to be positionally adjusted having a link end 119 located between the first and second planar sides 107, 109. Advantageously the cam bolt method embodying this invention comprises the steps of: passing a bolt 72 with a head 74, adapted for receiving a tool, and a threaded shaft 76 with a trilobal cross section through a first opening 90 in a first cam 84, wherein the first opening is shaped to match the trilobal cross section of the shaft 76 and sized to allow the first cam to freely slide along the shaft 76 but substantially preventing turning of the first cam 84 with respect to the shaft 76; passing the bolt 72 through the link end 119; passing the bolt 72 through a second opening 90 in a second cam 86, wherein the second opening is shaped to match the trilobal cross section of the shaft and sized to allow the second cam 86 to freely slide along the shaft 76 but substantially preventing turning of the second cam 86 with respect to the shaft 76, wherein the second cam 86 is identical to the first cam 84; and threadably engaging a nut 88 on an end of the shaft, wherein the first cam 84 engages the first and second followers 106 and 108 and the second cam 86 engages the third and fourth followers 126 and 128 to effect adjustment of the linkage member 118.

I claim:

1. A cam bolt system comprising:

(a) first and second cam followers aligned on either side of a first elongated slot in a first plane:

(b) third and fourth cam followers aligned on either side of a second elongated slot in a second plane parallel to the first plain and spaced perpendicularly apart therefrom, (c) a linkage member to be positionally adjusted having a link end located between the first and second planes;

(d) a bolt with a shaft and a head on a first end thereof, wherein a cross section of the shaft is trilobal in shape and wherein the trilobal shaped shaft is threaded from a second end opposite the head substantially the length of the shaft to the first end, wherein the shaft extends through the first elongated slot, the link end and the second elongated slot;

(e) first and second cams, each identical to the other and each having a generally circular perimeter and a triangularly shaped opening of substantially similar shape to the trilobal shape of the shaft and sized large enough so as to freely slide on the shaft, wherein the shaft extends through the openings of the first and second cams and wherein neither the first cam nor the second cam can substantially rotate with respect to the shaft and wherein the two cams are identically aligned with respect to the shaft and rotate eccentrically with rotation of the bolt, wherein the first cam is located longitudinally between the head and the first plane and laterally between the first and second cam followers; and (f) a nut threadably engaging the shaft at the second end thereof, wherein the second cam is located longitudinally between the nut and the second plane and laterally between the third and fourth cam followers, wherein rotation of the bolt causes rotation of the first and second cams, wherein the first and second cams engage the cam followers and achieve adjustment of the linkage.

2. A cam bolt system according to claim 1, wherein, in each cam, the opening has an apex pointing away from a first center of the cam toward a perimeter of the cam, wherein the opening is symmetrical about a line through the first center of the cam and a second center of the apex.

* * * * *